(12) United States Patent
Yonemoto et al.

(10) Patent No.: US 8,070,940 B2
(45) Date of Patent: Dec. 6, 2011

(54) FUEL FILTER DEVICE

(75) Inventors: Toshiyuki Yonemoto, Nagoya (JP);
Yoshihiko Ooya, Takahama (JP);
Shigeru Nonoyama, Nishikamo-gun
(JP); Osamu Takamisawa, Kariya (JP)

(73) Assignees: Denso Corporation, Kariya (JP);
Kyosan Denki Co., Ltd., Koga (JP)

( * ) Notice: Subject to any disclaimer, the term of this patent is extended or adjusted under 35 U.S.C. 154(b) by 587 days.

(21) Appl. No.: 12/245,117

(22) Filed: Oct. 3, 2008

(65) Prior Publication Data
US 2009/0090678 A1     Apr. 9, 2009

(30) Foreign Application Priority Data

Oct. 5, 2007   (JP) ................................. 2007-262319
Jun. 23, 2008  (JP) ................................. 2008-163836

(51) Int. Cl.
*B01D 27/02* (2006.01)

(52) U.S. Cl. ....... 210/86; 210/172.1; 210/209; 210/232; 210/266; 210/416.4; 210/438; 210/440

(58) Field of Classification Search ................ 210/172.1
See application file for complete search history.

(56) References Cited

U.S. PATENT DOCUMENTS

| | | | | |
|---|---|---|---|---|
| 4,276,161 A | * | 6/1981 | Matsui et al. | 210/86 |
| 4,515,690 A | * | 5/1985 | Yasuhara | 210/90 |
| 4,976,852 A | * | 12/1990 | Janik et al. | 210/86 |
| 5,766,463 A | * | 6/1998 | Janik et al. | 210/232 |
| 6,248,236 B1 | * | 6/2001 | Hodgkins | 210/232 |
| 6,783,665 B1 | * | 8/2004 | Girondi | 210/86 |
| 2008/0296288 A1 | | 12/2008 | Girondi | |

FOREIGN PATENT DOCUMENTS

| | | | |
|---|---|---|---|
| JP | 2006-105092 | | 4/2006 |
| SU | 1762969 | * | 9/1992 |

OTHER PUBLICATIONS

Chinese Office Action dated Nov. 12, 2010, issued in corresponding Chinese Application No. 200810161922.5 with English Translation.

* cited by examiner

*Primary Examiner* — Peter A Hruskoci
(74) *Attorney, Agent, or Firm* — Nixon & Vanderhye PC

(57) ABSTRACT

A filter element is formed from a filter material configured to capture a foreign substance in fuel. A lower case is attachable to and detachable from a bottom portion of a housing in a movable direction. The housing and the lower case are configured to accommodate the filter element. The filter element defines a passage extending through the filter element in the movable direction. The passage is configured to accommodate the component. The component is configured to be attached to and detached from the housing together with the lower case when the lower case is attached to and detached from the housing.

16 Claims, 9 Drawing Sheets

FUEL FILTER DEVICE

CROSS REFERENCE TO RELATED APPLICATIONS

This application is based on and incorporates herein by reference Japanese Patent Applications No. 2007-262319 filed on Oct. 5, 2007 and No. 2008-163836 filed on Jun. 23, 2008.

FIELD OF THE INVENTION

The present invention relates to a fuel filter device for filtering fuel.

BACKGROUND OF THE INVENTION

For example, a fuel filter device is provided in a fuel supply unit, which is provided between a fuel tank and a fuel injection pump for supplying fuel into a diesel engine or the like. The fuel filter device is configured to capture an organic foreign substance such as dust or an inorganic foreign substance such as metal in fuel, for example. The fuel filter device includes a filter element formed from a filter material for capturing the foreign substance in fuel.

A fuel filter device may include an additional component having a predetermined function to cope with a predetermined fuel environment. For example, according to JP-A-2006-105092, a fuel filter device is provided with a metal ion capturing material as the additional component for capturing metal ions in fuel, which cannot be substantially captured by the filter element. JP-A-2006-105092 discloses a configuration where the metal ion capturing material is inserted between two filter elements, which are collectively accommodated in a case.

While description is not made in JP-A-2006-105092, a metal ion capturing material is reduced in capturing capability after use. The metal ion capturing material reduced in capturing capability needs to be removed from the case, and a new or degenerated metal ion capturing material needs to be loaded into the case. However, in the structure of JP-A-2006-105092, the metal ion capturing material is inserted between the two filter elements. Therefore, the metal ion capturing material needs to be removed from the case together with filter elements being not necessary to be removed, and another metal ion capturing material needs to be loaded into the case together with different filter elements. That is, the metal ion capturing material cannot be easily loaded into and removed from the fuel filter device independently of the filter elements. Such a problem lies not only in the metal ion capturing material, but also lies in a component such as an auxiliary filter element for capturing particulate matters having a larger diameter than a diameter of particulate matters that can be captured by a filter element.

SUMMARY OF THE INVENTION

In view of the foregoing and other problems, it is an object of the present invention to produce a fuel filter device including a component capable of being easily attached to and detached from the fuel filter device independently from a filter element.

According to one aspect of the present invention, a fuel filter device comprises a filter element formed from a filter material configured to capture a foreign substance from fuel. The fuel filter device further comprises a component. The fuel filter device further comprises a housing. The fuel filter device further comprises a lower case being attachable to and detachable from a bottom portion of the housing in a movable direction. The housing and the lower case are configured to accommodate the filter element and the component. The filter element defines a passage, which extends through the filter element in the movable direction. The passage is configured to accommodate the component. The component is configured to be attached to and detached from the housing together with the lower case when the lower case is attached to and detached from the housing.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
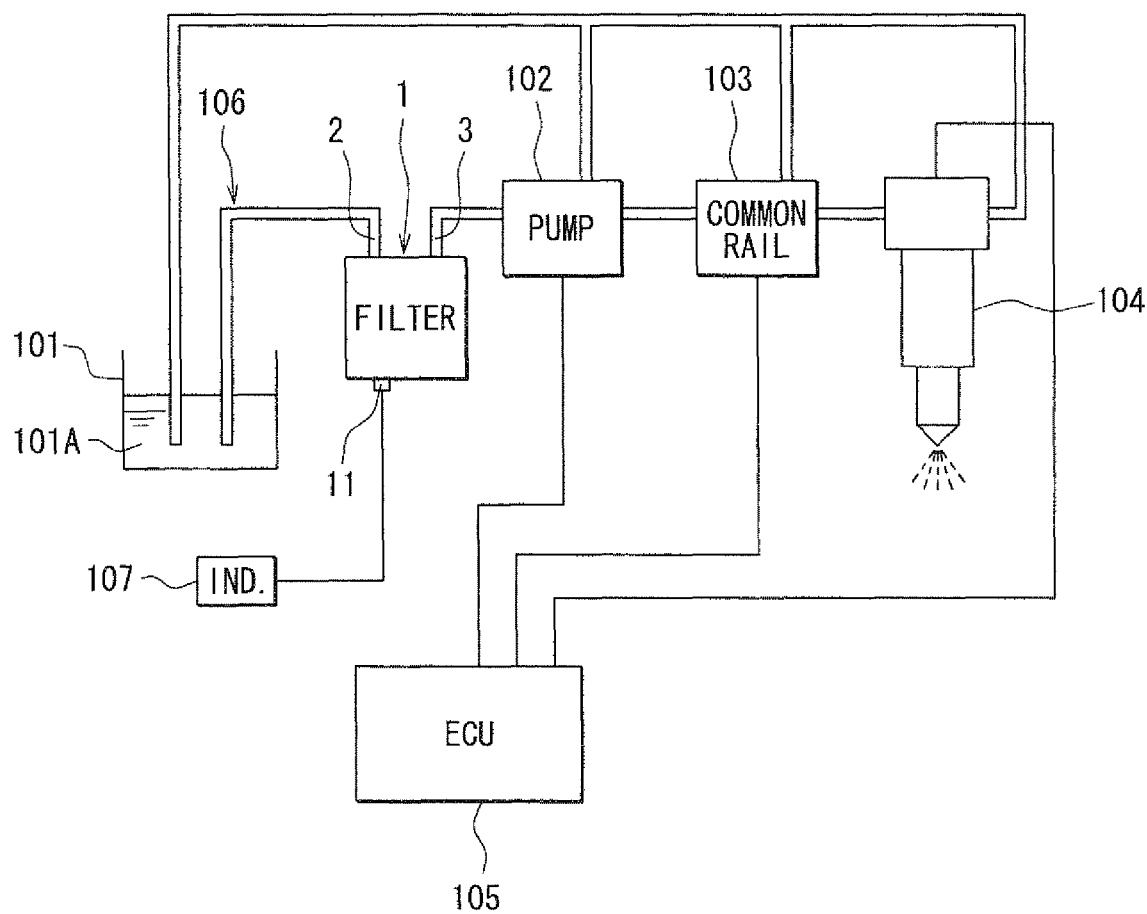
FIG. 1 is a schematic block diagram showing a fuel supply unit including a fuel filter device according to a first embodiment.

In FIG. 1, a fuel supply unit 100 includes a fuel tank 101, a fuel filter device 1, a fuel injection pump 102, a common rail 103, a fuel injection valve 104, a piping 106 for connecting the present components to one another, and an engine control unit (ECU) 105. Fuel 101A stored in the fuel tank 101 is fed by the fuel injection pump 102 into the common rail 103 via the fuel filter device 1, and accumulated in the common rail 103 at high pressure. The fuel at high pressure accumulated in the common rail 103 is supplied to the fuel injection valve 104 and injected into an internal combustion engine (not shown) from the fuel injection valve 104.

An operation of each of the fuel injection pump 102, the common rail 103, and the fuel injection valve 104 is controlled by the ECU 105 including a microcomputer having a well-known structure such that fuel is supplied from the common rail 103 into the fuel injection valve 104 at a specific timing so as to enhance fuel efficiency, for example.

The fuel 101A is fed from the fuel tank 101 into the fuel filter device 1, and a foreign substance such as a metal ion or a particulate matter contained in the fuel 101A is captured in the fuel filter device 1, and then the fuel is fed into the fuel injection pump 102. The fuel 101A flows into the fuel filter device 1 from an inlet pipe (inlet port) 2 as a part of the piping 106. The fuel 101A further flows out from an outlet pipe (outlet port) 3 as a part of the piping 106. The fuel filter device 1 has a level switch 11 described later and is configured to light an indicator 107 according to an alarm signal from the level switch 11.

Figure 2:
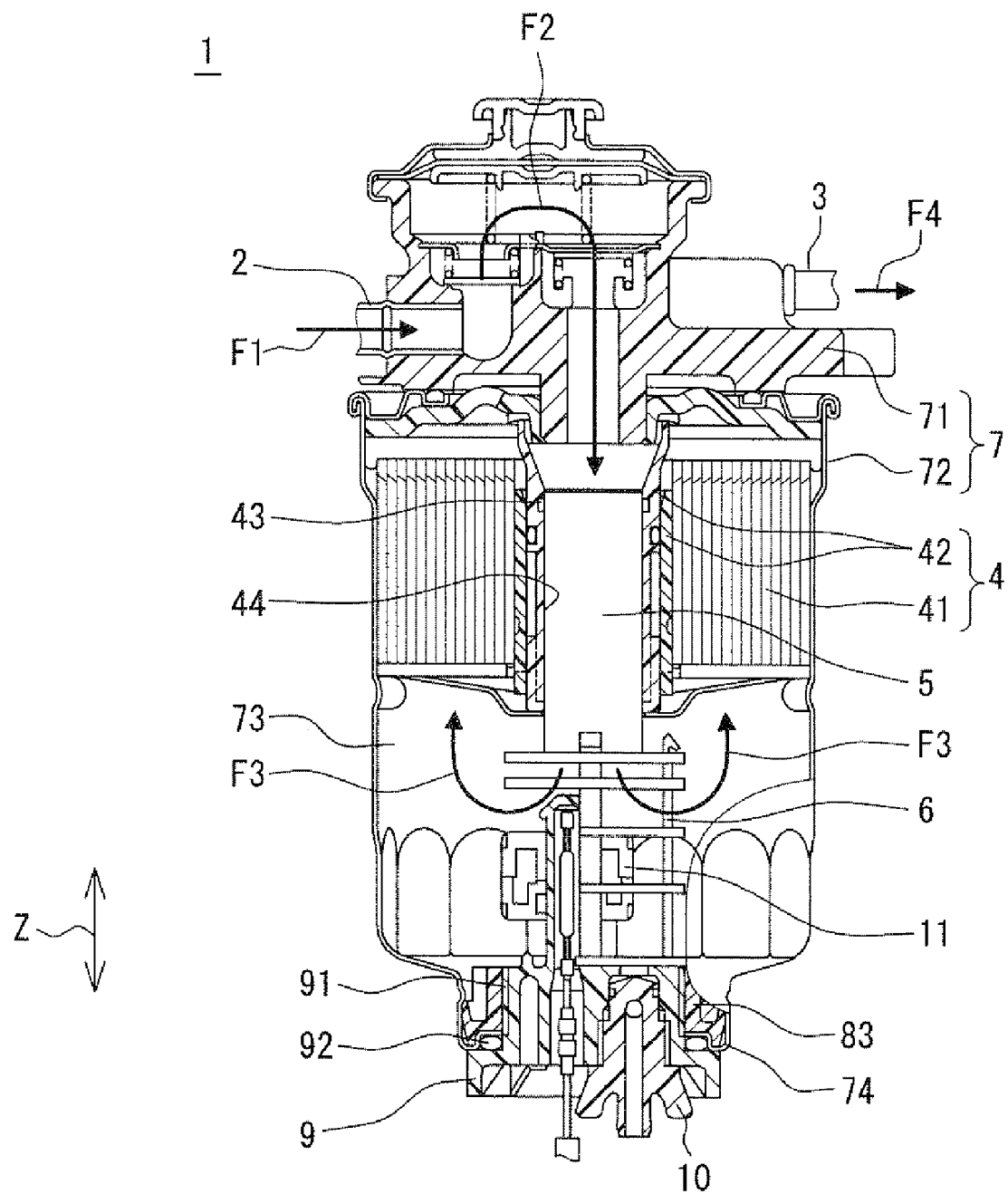
FIG. 2 is a schematic section diagram showing the fuel filter device 1 according to the first embodiment.

As shown in FIG. 2, the fuel filter device 1 includes an element 4 having a filter element 41 and a center cylinder 42, a component 5, a connection member 6, a case having a housing 7, a cap 9 being a lower case, a drain bolt 10, and a level switch 11.

The cap 9 is formed in a manner of being attachable in an attachment direction Z to the housing 7 at a side of a bottom 74 of the housing 7. The cap 9 is also formed in a manner of being detachable in a detachment direction Z from the housing 7. Specifically, the cap 9 has a screw portion 91, and the cap 9 is rotated in a rotation direction with the attachment and detachment directions (movable direction) Z as a rotation axis with respect to a coupling member 83 fixed to the housing 7. Thus, the screw portion 91 of the cap 9 is screwed with a screw portion of the coupling member 83, and hence the cap 9 is attached to the housing 7. In addition, the cap 9 is rotated in a direction opposite to the rotation direction in attachment with respect to the coupling member 83 fixed to the housing 7, so that the cap 9 is detached from the housing 7. A space between the cap 9 and the housing 7 is sealed by an O-ring 92. The cap 9 is attached to the housing 7, thereby a case is formed, which accommodates the element 4, the component 5, and the connection member 6.

The housing 7 includes an upper housing 71 made of resin or metal and a lower housing 72 made of metal. An inlet pipe 2 through which the fuel 101A flows into the fuel filter device 1 and an outlet pipe 3 through which the fuel 101A flows out from the fuel filter device 1 are fixed to the upper housing 71. The fuel filter device 1 is configured such that the fuel 101A flows from the inlet pipe 2 into the fuel filter device 1 along a passage F1. The fuel 101A then passes through a metal ion capturing material 51 (FIG. 4) of the component 5 and the filter element 41 of the element 4 along passages F2 and F3, and then flows out from the outlet pipe 3 along a passage F4. Moreover, a sediment reservoir (reservoir space) 73 is provided below the filter element 41 within the case (lower housing 72). The sediment reservoir is a reservoir space for storing water separated from the fuel 101A by using difference in specific gravity between the fuel 101A and water.

The filter element 41 is formed from a filter material configured to capture particulate matters in the fuel 101A passing through the filter element 41. The present filter material is formed from filter paper or a nonwoven fabric having a pore size that enables capture of the particulate matters. The center cylinder 42 is provided at a center side of the filter element 41. An inner space of the center cylinder 42 configures a passage 44 for the fuel 101A. The passage penetrates the filter element 41 in the attachment and detachment directions Z of the cap 9, as shown in FIG. 3.

The element 4 mainly includes the filter element 41. The center cylinder 42 is formed in an annular disk shape using metal such as a spring steel. The element 4 and the center cylinder 42 are supported by a lower supporting member 82 and fixed within the lower housing 72 by an upper supporting member 81 via a seal member 811. The seal member 811 seals a space between a clean side at a side of the lower housing 72 and an unclean side at a side of the upper housing 71. A space between the upper housing 71 and the upper supporting member 81 is sealed by an O-ring 711.

Figure 3:
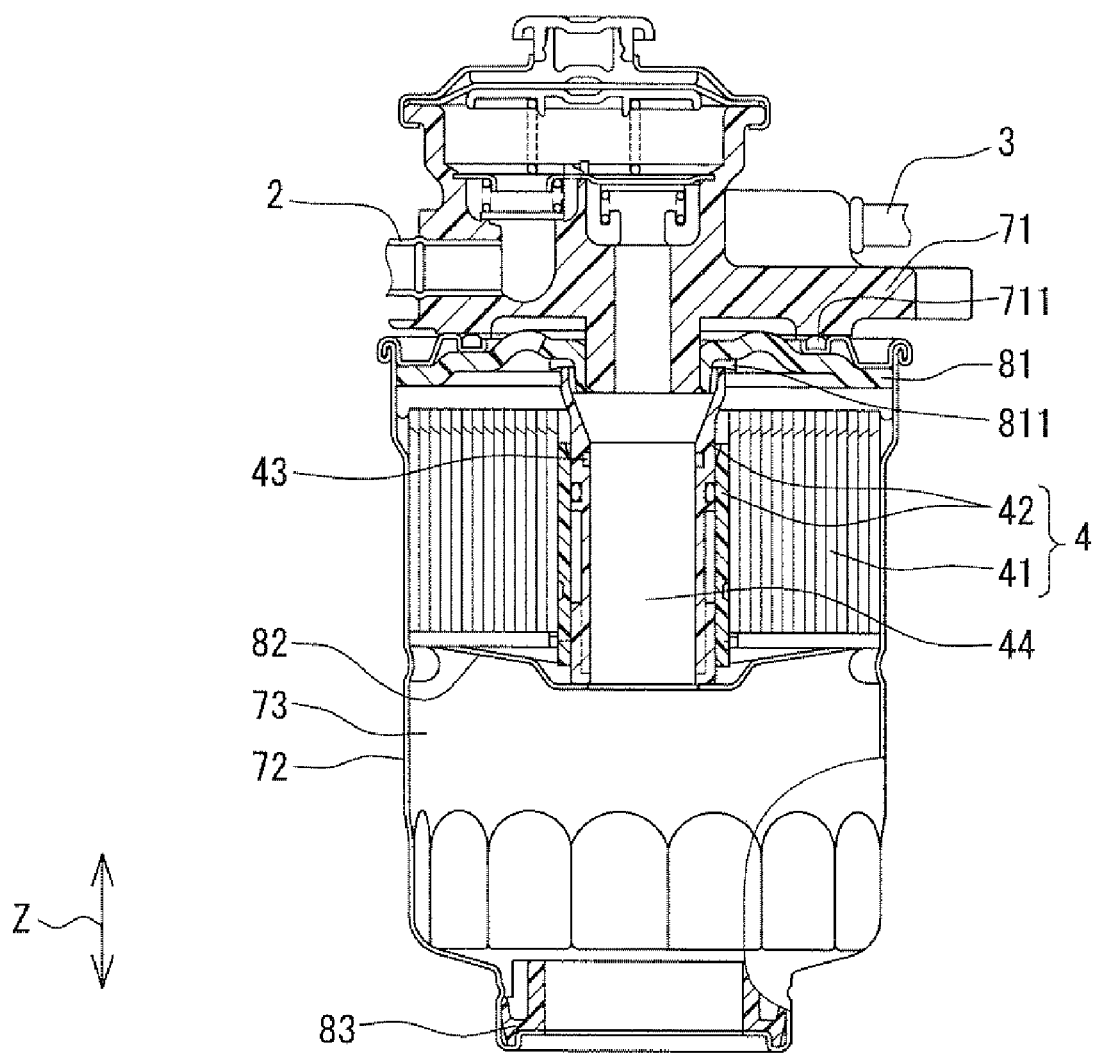
FIG. 3 is a schematic section diagram showing a condition where a cap 9 connected with a component 5 is detached from the fuel filter device 1 of FIG. 2.
Figure 4:
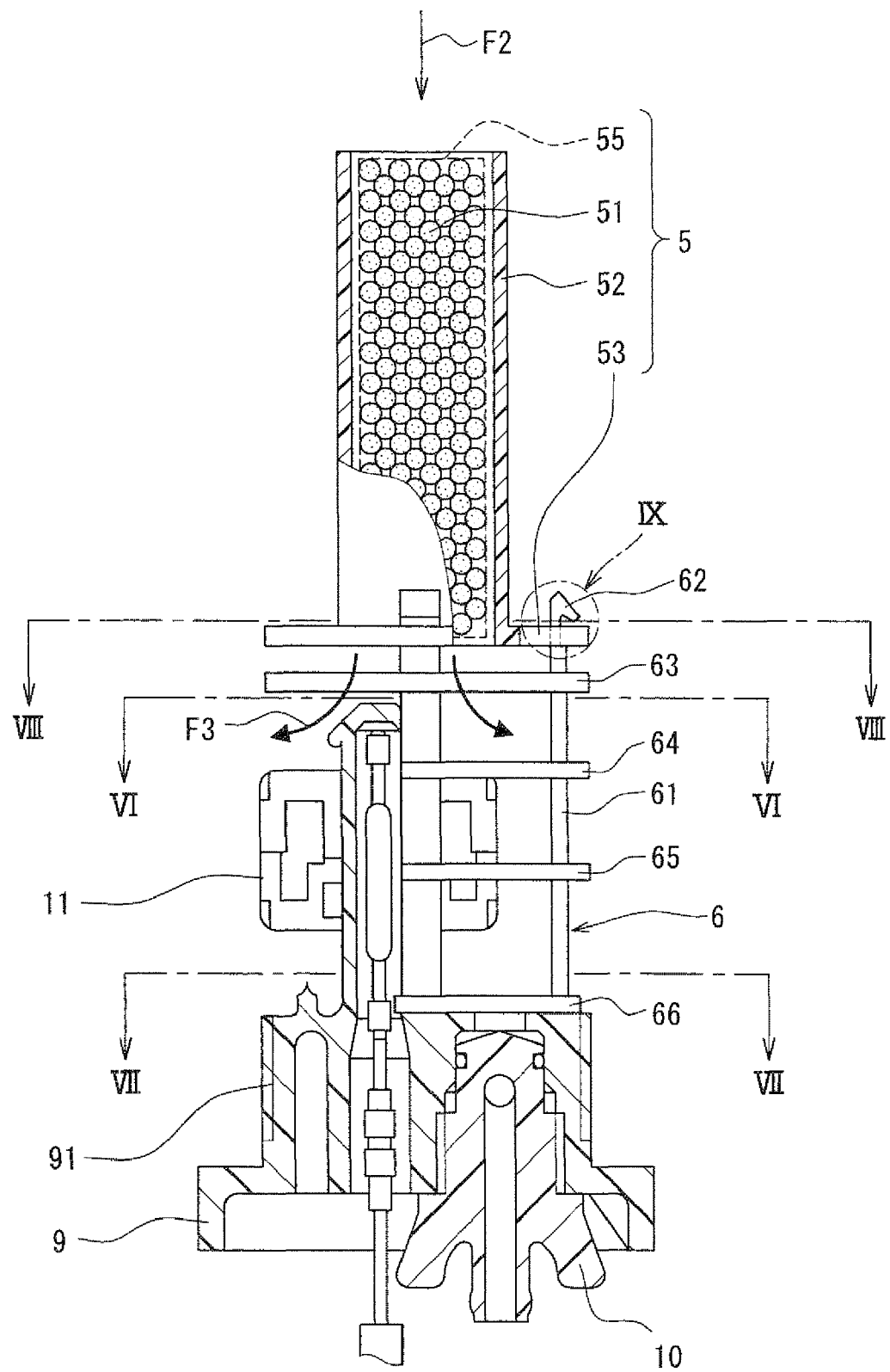
FIG. 4 is a schematic partial section diagram showing a condition where the component 5 is connected to the cap 9 by a connection member 6 in FIG. 2.
Figure 5:
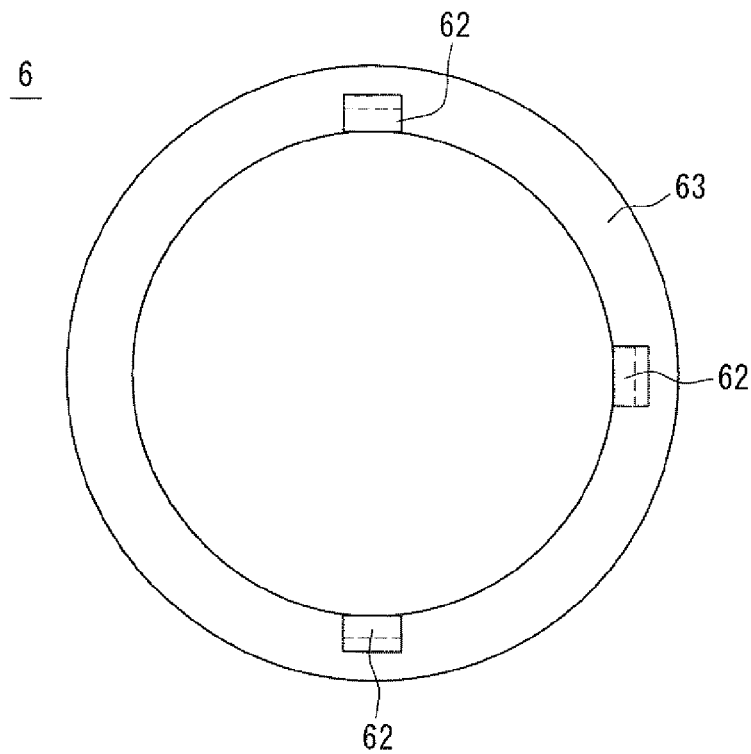
FIG. 5 is a plan diagram of the connection member 6 in FIG. 2.

As shown in FIGS. 2 and 3, the component 5 is provided in the passage 44. A space between the component 5 and the center cylinder 42 is sealed by an O-ring 43. In thee present structure, the fuel 101A in the passage F2 passes through the metal ion capturing material 51 in the component 5. As shown in FIG. 4, the component 5 includes the granular metal ion capturing material 51, a mesh 55 to be filled with the metal ion capturing material 51, a pipe-shaped pipe case 52 for holding the mesh 55 filled with the metal ion capturing material 51, and a plate 53. The pipe case 52 and the plate 53 are integrally formed from resin.

The metal ion capturing material 51 captures metal ions in the fuel 101A passing through the metal ion capturing material 51. For example, the metal ion capturing material 51 is formed from chelate resin (CR20 manufactured by Mitsubishi Chemical Corporation) configured to capture a metal ion by forming a chelate (complex) with the metal ion. The chelate resin is granularly formed, thereby surface area of the metal ion capturing material 51 is increased, so that metal ion capturing performance of the metal ion capturing material 51 is enhanced.

The chelate resin may not be granularly formed. Alternatively, the chelate resin may be formed in a fibrous shape or the like to increase the surface area of the metal ion capturing material 51. In addition, the metal ion capturing material may be formed from ion exchange resin, which is configured to capture metal ions by using ion exchange, instead of the chelate resin.

Since both ends of the pipe case 52 are opened, the fuel 101A passes through the metal ion capturing material 51 via the mesh 55 along the passage F2 while metal ions in the fuel 101A are captured by the metal ion capturing material 51. The fuel 101A, from which metal ions have been captured, passes through the mesh 55, and then flows out from the pipe case 52 along the passage F3.

Since the metal ion capturing material 51 with the mesh 55 are accommodated in the pipe case 52 so as to be formed in a unit, the metal ion capturing material 51 is easily replaced. A configuration may be used, in which the mesh 55 stops up the opening at either end of the pipe case 52, rather than the configuration in which the mesh 55 is filled with the metal ion capturing material 51.

In this way, the component 5 is configured to capture the metal ions by including the metal ion capturing material 51 configured to capture metal ions in the fuel 101A.

The component 5 is configured to be loaded into the housing 7 along with attachment of the cap 9 to the housing 7. In addition, the component 5 is configured to he removed from the housing 7 along with detachment of the can 9 from the housing 7. Specifically, the component 5 is connected to the cap 9 via the connection member 6, thereby the component 5 can be loaded into and removed from the housing 7 together with the lower case. Moreover, as described before, the component 5 is provided in the passage 44 for the fuel 101A, the passage penetrating the filter element 41 in the attachment and detachment directions Z of the cap 9. Therefore, the component 5 can be attached to and detached from the housing without causing interference with the filter element 41 in the attachment and detachment directions Z of the cap 9. That is, the component S can be loaded into and removed from the housing 7 independently of the filter element 41 in the attachment and detachment directions Z of the cap 9.

In the present structure, the component 5 can be loaded into and removed from the housing 7 independently of the filter element 41 along with attachment and detachment of the cap 9 to/from the housing 7. That is, the component 5 having the function of capturing metal ions in the fuel 101A can be easily loaded into and removed from the fuel filter device 1 independently of the filter element 41.

As shown in FIGS. 4 to 7, the connection member 6 includes three fitting portions 617 a ring-shaped first reinforcement plate 63, a semi-ring-shaped second reinforcement plate 64, a semi-ring-shaped third reinforcement plate 65, and a semi-ring-shaped fourth reinforcement plate 66, which are integrally formed from resin. The connection member 6 is connected to the cap 9 via caulking portions 93, and connected to the component 5 via the three fitting portions 61.

Each of the caulking portions 93 is formed by thermally caulking the cap 9 made of resin and the fourth reinforcement plate 66 made of resin. The connecting portion between the connection member 6 and the cap 9 are not limitedly made in such a way, For example, a cap 9 made of metal and the fourth reinforcement plate 66 made of resin may be connected by hooking or screwing.

Figure 6:
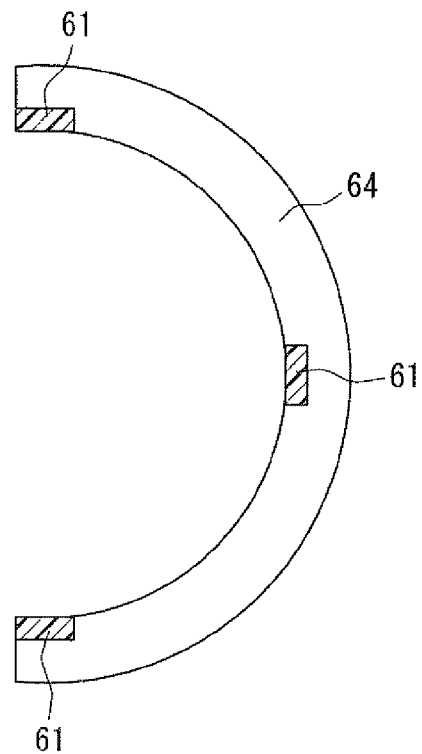
FIG. 6 is an enlarged section diagram along a line VI-VI in FIG. 4.
Figure 7:
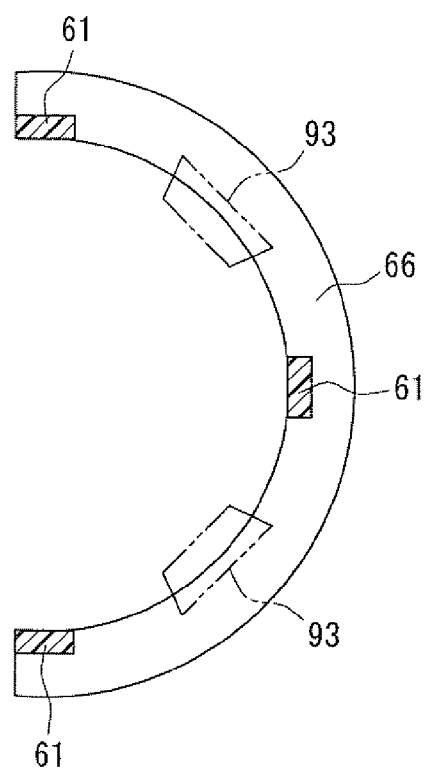
FIG. 7 is an enlarged section diagram along a line VII-VII in FIG. 4.

In FIGS. 6 and 7, portions other than the connection member 6 are omitted for better viewing of drawings.

Figure 8:
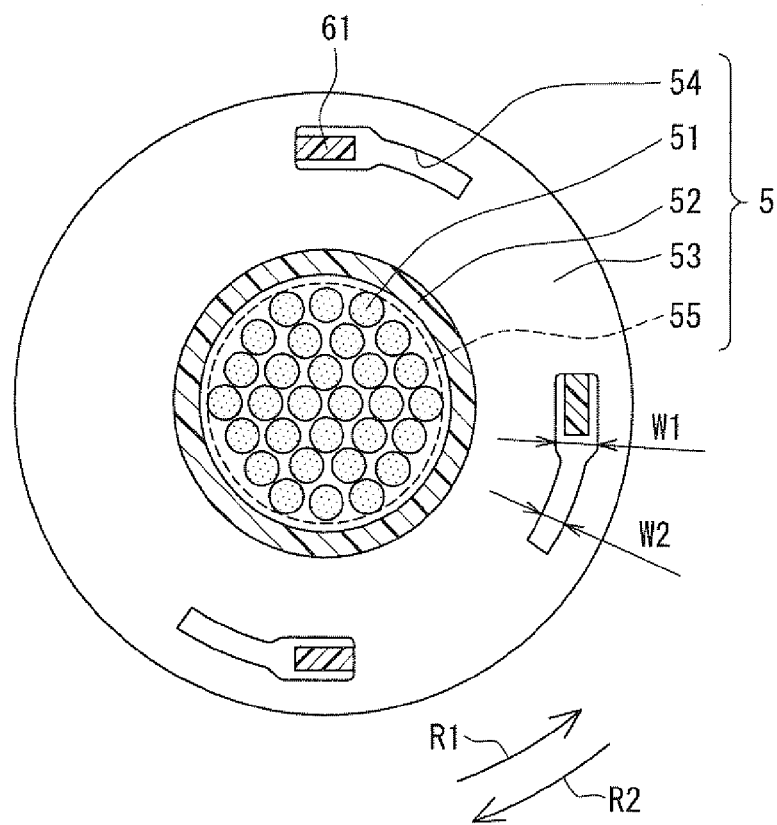
FIG. 8 is an enlarged section diagram along a line VIII-VIII in FIG. 4.

A claw 62 is formed at an end of each fitting portion 61. As shown in FIG. 8, windows 54 are formed in the plate 53 of the component 5, each window 54 being an opening to be fitted with each fitting portion 61. That is, the plate 53 of the component 5 and the connection member 6 configure a connecting portion between the component 5 and them cap 9.

The cap 9 is rotated with respect to the housing 7 (a fitting member 83) in a circumferential direction (first and second directions) R1 or R2 in FIG. 2, that is, in a rotational direction, and the cap 9 is attached to or detached from the housing 7. The window 54 includes first, second and third portions. The first portion has a first width W1 as a radial width larger than a radial width of the fitting portion 61. The second portion has a second width W2 as a radial width smaller than the radial width of the fitting portion 61. The third portion has third a radial width, which is between the first width W1 and the second width W2.

In the present structure, when the cap 9 is rotated with respect to the housing 7 to be attached to or detached from the housing 7, the fitting portion 61 can move within the window 54 along the circumferential direction R1 or R2. That is, when the cap is attached to and detached from the housing 7, the fitting portion 61 can move along the circumferential direction R1 or R2. An arrow R1 shows a direction along which the fitting portion 61 moves within the window 54 when the cap 9 is attached to the housing 7. An arrow R2 shows a direction along which the fitting portion 61 moves within the window 54 when the cap 9 is detached from the housing 7.

Figure 9:
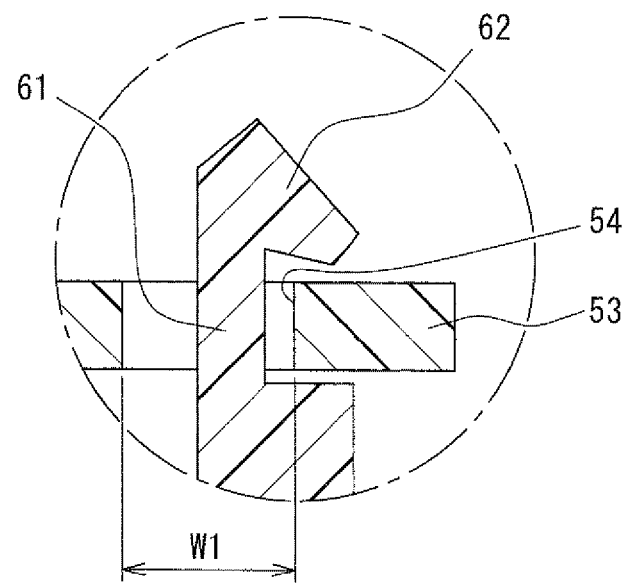
FIG. 9 is an enlarged cross section diagram of a region IX in FIG. 4.

When the cap 9 is attached to the housing 7, the plate 53 of the component 5 and the fitting portion 61 of the connection member 6 are in the condition shown in FIG. 8. In the present condition, the fitting portion 61 is inserted into the first portion of the window 54 having the first width W1. As shown in FIGS. 8 and 9, the first width W1 of the first portion of the window 54 and the radial width of the fitting portion 61 therebetween have the difference, thereby the first portion of the window 54 and the fitting portion 61 therebetween define a gap.

In an actual structure, a center axis of the component 5 (pipe case 52) is displaced in general from a center axis of the center cylinder 42 within a manufacturing tolerance, for example. In the present structure show in FIGS. 8, 9, the gap between the first portion of the window 54 and the fitting portion 61 is configured to absorb and relax stress caused by the displacement of the center axis of the component from the center axis of the center cylinder 42.

Figure 10:
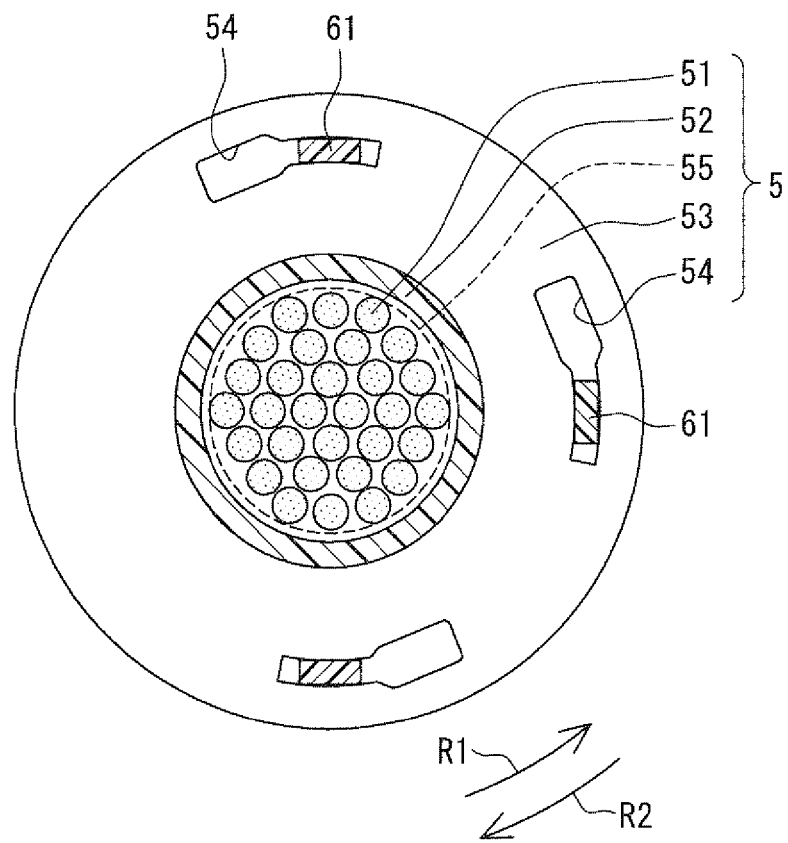
FIG. 10 is an enlarged section diagram corresponding to FIG. 8 in the case that the cap 9 is detached from a housing 8.

On the other hand, when the cap 9 is detached from the housing 7, the second portion of the window 54 having the second width W2 is fitted with the fitting portion 61 as shown in FIG. 10. Therefore, when the cap 9 is detached from the housing 7; the fitting portion 61 of the connection member 6 and the plate 53 of the component 5 are firmly connected to each other in the second portion of the window 54 having the second width W2. Thus, the component 5 can be further firmly connected to the cap 9 by the connection member 6, and consequently the component 5 can be securely detached from the housing 7 when the cap 9 is detached from the housing 7.

In FIGS. 2 and 4, a drain bolt 10 as a valve is provided for draining water, which is separated from fuel and stored in the sediment reservoir 73. Further, a level switch 11 is provided for detecting that a level of water stored in the sediment reservoir 73 reaches a predetermined level. The level switch 11 may cause a warning signal when the level of water stored in the sediment reservoir 73 reaches the predetermined level. An indicator 107 may be activated according to the warning signal caused by the level switch 11. For example, the indicator may be lit so as to enable recognition of the fact that the level of water stored in the sediment reservoir 73 reaches the predetermined level. The drain bolt 10 and the level switch 11 are mounted on the cap 9. Thus, the drain bolt 10 and the level switch 11 can be easily mounted and removed together with the component 5 independently of the filter element 41.

Hereinbefore, the fuel filter device 1 according to the first embodiment includes the filter element 41 formed from the filter material configured to capture a foreign substance in the fuel 101A. The fuel filter device 1 further includes the component 5 having a predetermined function. The fuel filter device 1 further includes the case including the housing 7 and the cap 9 and accommodating the filter element 41 and the component 5. The cap 9 as the lower case is formed in a manner of being attached to and detached from the housing 7 at the side of the bottom 74 of the housing 7. The component 5 is provided in the passage 44, which is for leading fuel. The passage extends through the filter element in the attachment and detachment directions Z of the cap 9. The component 5 is configured to be loadable into and removable from the housing 7, as the cap 9 is attached to and detached from the housing 7.

Thus, in the present structure, the metal ion capturing material 51 and the like can be easily loaded and removed together with the component 5 independently from the filter element 41.

Figure 11:
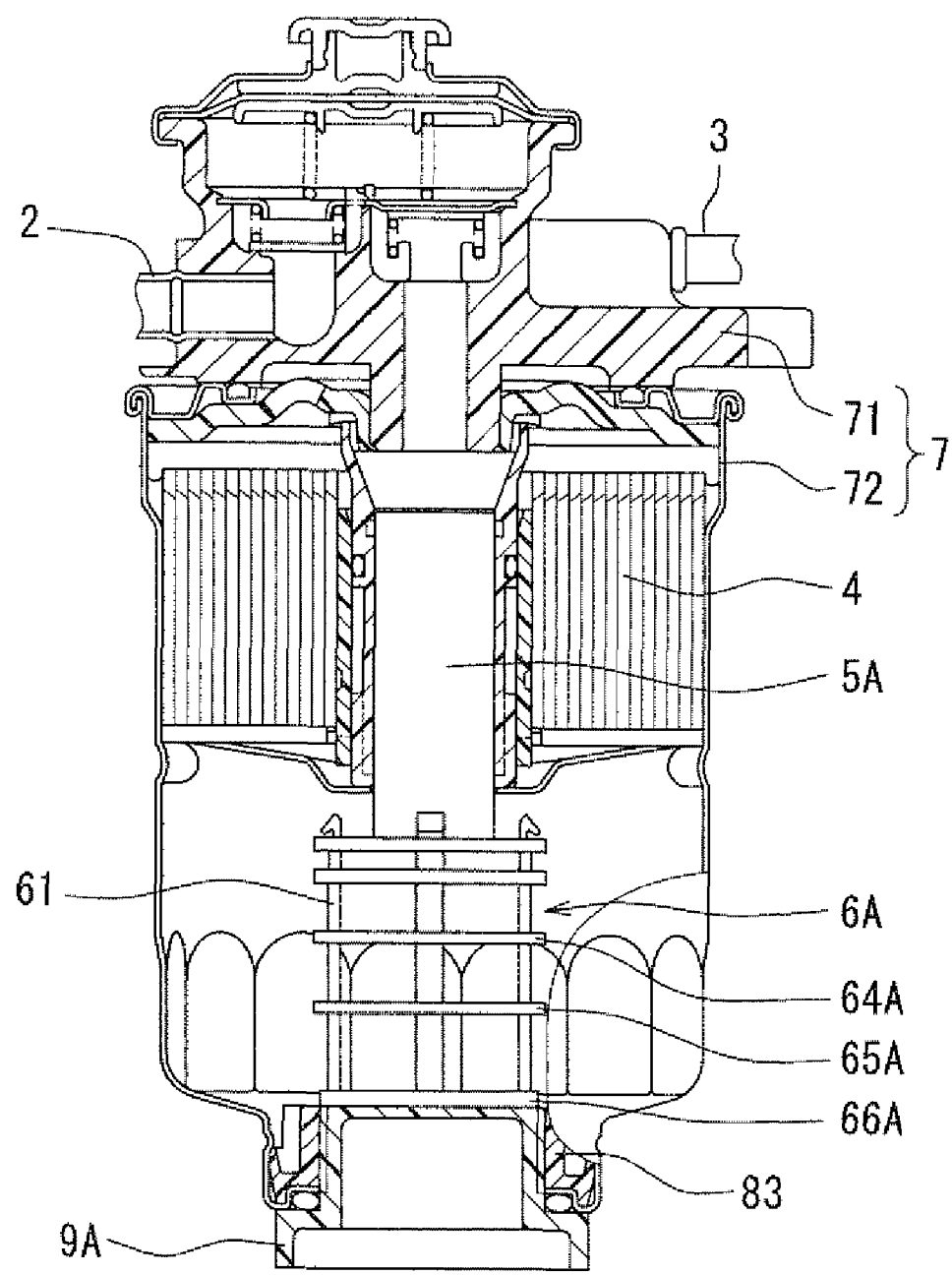
FIG. 11 is a schematic section diagram showing a fuel filter device 1A according to a second embodiment.

That is, the fuel filter device has a structure, in which the component can be easily loaded and removed independently of the filter element, Second Embodiment In the first embodiment, the drain bolt 10 and the level switch 11 are mounted on the cap 9. Alternatively, as shown in FIG. 11, a cap 9A, on which the drain bolt 10 and the level switch 11 are not mounted, may be used instead of the cap 9. Thus, the cap 9A is connected to a component 5A by using a connection member 6A in place of the connection member 6. In the connection member 6A, a fitting portion 61 is added in a position of the level switch 11 shown in FIG. 2, and ring-shaped reinforcement plates 64A to 66A are provided in place of the semi-ring-shaped reinforcement plates 64 to 66. In the component 5A being provided in place of the component 5, the window 54 is added in a position corresponding to the added fitting portion 61. Even in the second embodiment, the same advantages as those described above can be obtained.

In the examples, the component 5 or 5A is connected to the connection member 6 or 6A by using the fitting portions 61 of the connection member 6 or 6A respectively. Alternatively, the component 5 or 5A and the connection member 6 or 6A may be integrally structured respectively. Specifically, the plate 53 of the component 5 and the fitting portions 61 of the connection member 6 may be integrally formed from resin. That is, the pipe case 52 and the plate 53 of the component 5 and the fitting portions 61 and the reinforcement plates 63 to 66 of the connection member 6 may be integrally formed from resin.

Figure 12:
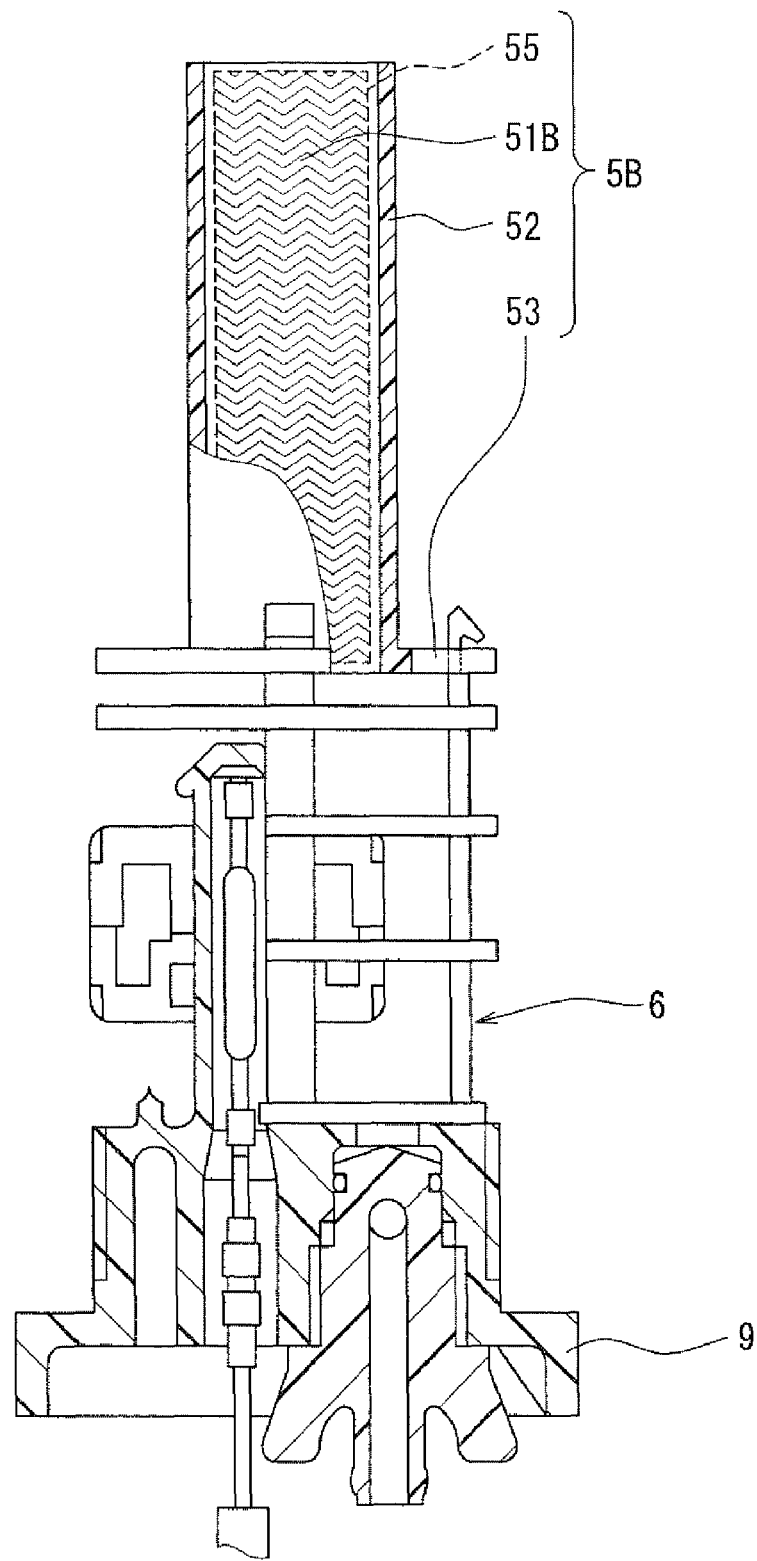
FIG. 12 is a schematic partial section diagram showing a modification of a configuration of FIG. 4.

In the examples, the component 5 or 5A incorporates the metal ion capturing material 51 and is configured to capture metal ions in the fuel 101A. The structure of the fuel filter device is not limited to the above structure incorporating the metal ion capturing material 51. For example, the component 5B may include an auxiliary filter material 51B having a pore size, which is larger than a pore size of the filter material 41, and configured to capture of some particulate matters. More specifically, the auxiliary filter material 51B is configured to capture other particulate matters having a diameter larger than a diameter of the particulate matters that can be captured by the filter material 41. That is, the auxiliary filter material 51B being rough compared with the filter material 41 can be incorporated in the component 5B as shown in FIG. 12. Specifically, the component 5B includes the auxiliary filter material 51B, a mesh 55 that encloses the auxiliary filter material 51B, a pipe-shaped pipe case 52 that holds the mesh 55 enclosing the auxiliary filter material 51B, and the plate 53. The pipe case 52 and the plate 53 are integrally formed from resin.

In the present structure of the component 5B, the component 5B is configured to capture particulate matters having a diameter larger than a diameter of particulate matters that can be captured by the filter material 41, in place of the function of capturing metal ions in the fuel 101A. That is, the component 5B has the auxiliary filter material 51B that assists a capture function of the filter material 41 of capturing a foreign substance in the fuel 101A. Thus, the auxiliary filter material 51B and the like can be easily loaded and removed together with the component 5B independently of the filter material 41.

The number of the windows 54 and the number of the fitting portions 61 are not limited to the numbers described in the above embodiments, and can be arbitrary determined.

In the above embodiments, the fitting portion 61 has the end provided with the claw 62, and the claw 62 is configured to be hooked to the second portion when the lower case 9 is rotated in the direction R2 in the condition where the fitting portion 61 is inserted into the first portion. The lower case 9 is configured to be screwed in the first direction R1 when the lower case 9 is attached to the housing 7, and the lower case 9 is configured to be screwed in the second direction R2 when the lower case 9 is detached from the housing 7. The fitting portion 61 has the end provided with the claw 62, and the fitting portion 61 is configured to be hooked to the second portion when the lower case 9 is rotated in the second direction R2. In the present condition, the component 5, 5A is configured to be pulled from the housing 7 together with the lower case 9 in the axial direction of the passage 44 by rotating the lower case 9 relative to the housing 7 in the second direction to detach the lower case 9 from the housing 7. Therefore, the component 5, 5A can be easily pulled out of the housing 7 together with the lower case 9. The passage 44 may extend through the filter element 41 in the axial direction.

In the above embodiments, the housing 7 has the inlet port 2, which is configured to lead fuel into the housing 7, and the outlet port 3 configured to lead fuel out of the housing 7. The filter element 41 is configured to circumferentially surround the outer circumferential periphery of the component 5, 5A when the component 5, 5A is accommodated in the passage 44. The inlet port 2, the passage 44, the filter element 41, and the outlet port 3 are configured to lead fuel in order. The order of fuel flow may be arbitrary determined.

The above structures of the embodiments can be combined as appropriate. Various modifications and alternations may be diversely made to the above embodiments without departing from the spirit of the present invention.

What is claimed is:

1. A fuel filter device comprising:
   a filter element formed from a filter material configured to capture a foreign substance from fuel;
   a component including a capturing material to capture matter from fuel;
   a housing; and
   a lower case being attachable to and detachable from a bottom portion of the housing in a movable direction,
   wherein the housing and the lower case are configured to accommodate the filter element and the component,
   the filter element defines a passage, which extends through the filter element in the movable direction,
   the passage is configured to accommodate the component,
   the component is configured to be attached to and detached from the housing together with the lower case when the lower case is attached to and detached from the housing,
   the component is connected to the lower case,
   the component and the lower case therebetween have a connecting portion including at least one fitting portion and at least one opening configured to be connected with each other,
   each of the opening has first, second, and third portions arranged in a circumferential direction, the first, second, and third portions respectively having first, second, and third widths in a radial direction,
   each of the fitting portion has a fitting-portion width in the radial direction,
   the first width is larger than the fitting-portion width,
   the second width is smaller than the fitting-portion width, and
   the third width is between the first width and the second width.

2. The fuel filter device according to claim 1, wherein the capturing material is a metal ion capturing material configured to capture a metal ion from fuel.

3. The fuel filter device according to claim 2, wherein the metal ion capturing material is formed from chelate resin being one of granular and fibrous.

4. The fuel filter device according to claim 2, wherein the metal ion capturing material is formed from ion-exchange resin configured to conduct ion exchange so as to capture the metal ion in the fuel.

5. The fuel filter device according to claim 1, wherein the capturing material is an auxiliary filter element configured to assist the filter element in capturing a foreign substance in fuel.

6. The fuel filter device according to claim 1,
   wherein the first portion is connected with the fitting portion when the lower case is attached to the housing, and the second portion is fitted with the fitting portion when the lower case is detached from the housing.

7. The fuel filter device according to claim 1, wherein the lower case has a reservoir space, which is located below the filter element and configured to store water separated from fuel,
the fuel filter device further comprising:
a level switch provided to the lower case and configured to detect a level of water stored in the reservoir space.

8. The fuel filter device according to claim 7, wherein the lower case is configured to cause a warning signal when detecting that the level of the water reaches a predetermined level.

9. The fuel filter device according to claim 1, wherein the lower case has a reservoir space, which is located below the filter element and configured to store water separated from fuel,
the fuel filter device further comprising:
a drain bolt provided to the lower case and configured to drain water stored in the reservoir space.

10. The fuel filter device according to 1, wherein the fitting portion has an end provided with a claw, and
the claw is configured to be hooked to the second portion when the lower case is rotated in a direction in a condition where the fitting portion is inserted into the first portion.

11. The fuel filter device according to claim 1, wherein the lower case is configured to be screwed in a first direction when the lower case is attached to the housing,
the lower case is configured to be screwed in a second direction when the lower case is detached from the housing,
the fitting portion has an end provided with a claw, and
the claw is configured to be hooked to the second portion when the lower case is rotated in the second direction in a condition where the fitting portion is inserted into the first portion.

12. The fuel filter device according to claim 11, wherein the component is configured to be pulled from the housing together with the lower case in the movable direction by rotating the lower case relative to the housing in the second direction to detach the lower case from the housing.

13. The fuel filter device according to claim 12, wherein the passage extends through the filter element in an axial direction of the passage.

14. The fuel filter device according to claim 1,
wherein the housing has an inlet port configured to lead fuel into the housing,
the housing has an outlet port configured to lead fuel out of the housing,
the filter element is configured to circumferentially surround an outer circumferential periphery of the component when the component is accommodated in the passage, and
the inlet port, the passage, the filter element, and the outlet port are configured to lead fuel in order.

15. A fuel filter device comprising:
a filter element formed from a filter material configured to capture a foreign substance from fuel;
a component including a capturing material to capture matter from fuel;
a housing; and
a lower case being attachable to and detachable from a bottom portion of the housing in a movable direction,
wherein the housing and the lower case are configured to accommodate the filter element and the component,
the filter element defines a passage, which extends through the filter element in the movable direction,
the passage is configured to accommodate the component,
the component is configured to be attached to and detached from the housing together with the lower case when the lower case is attached to and detached from the housing,
the component is connected to the lower case,
wherein the component and the lower case therebetween have a connecting portion including a plurality of fitting portions and a plurality of openings respectively configured to be connected with each other,
each of the plurality of openings has first, second, and third portions arranged in a circumferential direction, the first, second, and third portions respectively having first, second, and third widths in a radial direction,
each of the plurality of the fitting portion has a fitting-portion width in the radial direction,
the first width is larger than the fitting-portion width,
the second width is smaller than the fitting-portion width, and
the third width is between the first width and the second width.

16. The fuel filter device according to claim 15,
wherein the first portion is inserted with the fitting portion when the lower case is attached to the housing, and
the second portion is fitted with the fitting portion when the lower case is detached from the housing.

* * * * *